United States Patent
Lunghofer

(10) Patent No.: US 8,147,300 B2
(45) Date of Patent: Apr. 3, 2012

(54) UNIVERSAL VEHICLE WINDOW VENT

(76) Inventor: Michael D. Lunghofer, Athens, AL (US)

( * ) Notice: Subject to any disclaimer, the term of this patent is extended or adjusted under 35 U.S.C. 154(b) by 1204 days.

(21) Appl. No.: 11/873,082

(22) Filed: Oct. 16, 2007

(65) Prior Publication Data

US 2008/0113601 A1  May 15, 2008

Related U.S. Application Data

(60) Provisional application No. 60/852,762, filed on Oct. 19, 2006.

(51) Int. Cl.
*B60J 1/20* (2006.01)
*B60J 1/00* (2006.01)

(52) U.S. Cl. .............................. 454/131; 454/128

(58) Field of Classification Search .......... 454/130–135, 454/128; 29/428
See application file for complete search history.

(56) References Cited

U.S. PATENT DOCUMENTS

| | | | | |
|---|---|---|---|---|
| 2,034,528 A * | 3/1936 | Oakes | ................. | 454/131 |
| 2,919,638 A * | 1/1960 | Mathews | ................. | 454/133 |
| 3,866,524 A * | 2/1975 | Forbes, Jr. | ................. | 454/131 |
| D246,644 S | 12/1977 | McCarroll | | |
| 4,341,150 A | 7/1982 | McConnell | | |
| 4,347,781 A | 9/1982 | Hassell | | |
| 4,426,111 A | 1/1984 | Smith | | |
| 4,685,718 A * | 8/1987 | Steenblik et al. | ............. | 296/154 |
| 4,756,242 A * | 7/1988 | Keith | ................. | 454/133 |
| 4,913,035 A * | 4/1990 | Duh | ................. | 454/121 |
| 5,094,151 A | 3/1992 | Bernard | | |
| 5,284,377 A * | 2/1994 | Krenciprock | ................. | 296/154 |
| 5,525,105 A * | 6/1996 | Deary | ................. | 454/131 |
| 5,797,645 A * | 8/1998 | Schenk et al. | ................. | 296/152 |
| D404,698 S | 1/1999 | Schenk et al. | | |
| 5,921,859 A * | 7/1999 | Foster | ................. | 454/131 |
| 6,042,473 A * | 3/2000 | McClary | ................. | 454/133 |
| 6,106,385 A | 8/2000 | Humphrey et al. | | |
| 6,350,195 B1 * | 2/2002 | Iino | ................. | 454/131 |
| 6,796,358 B1 | 9/2004 | Moore | | |
| 6,843,717 B1 * | 1/2005 | Bennett | ................. | 454/152 |
| 7,172,240 B1 * | 2/2007 | Kaufman | ................. | 454/131 |
| 2007/0243809 A1 * | 10/2007 | Szwed et al. | ................. | 454/131 |
| 2011/0045757 A1 * | 2/2011 | Szwed et al. | ................. | 454/131 |

FOREIGN PATENT DOCUMENTS

JP                02034450       *  2/1990

OTHER PUBLICATIONS

English Abstract of JP 02034450, Pub. date Feb. 1990.*

* cited by examiner

*Primary Examiner* — Steven B McAllister
*Assistant Examiner* — Phillip E Decker
(74) *Attorney, Agent, or Firm* — J. Mark Bledsoe; Jacob Neu Bradley Arant Boult Cummings LLP

(57) ABSTRACT

A universal vehicle window vent is provided. The window vent has a bottom portion for receiving a vehicle window, and a top portion for engaging the window channel of a vehicle's door. The window vent is dimensioned to fit any vehicle window such that when it is installed, an opening is created.

4 Claims, 4 Drawing Sheets

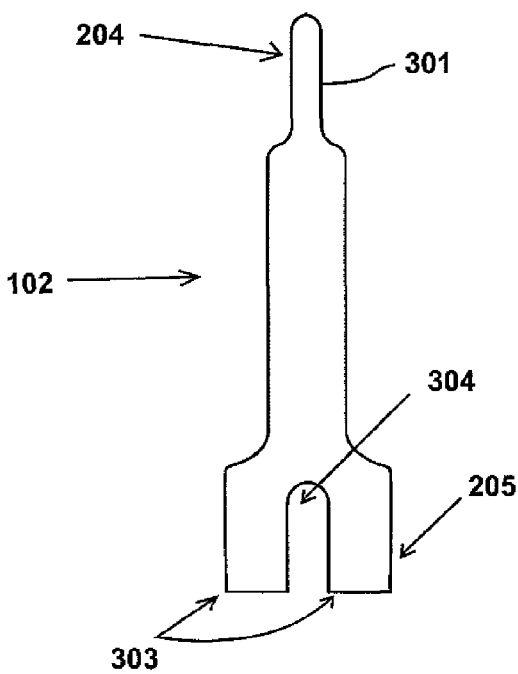
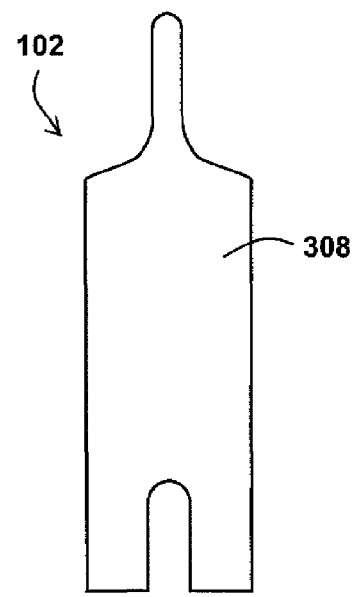
Figure 3A          Figure 3B
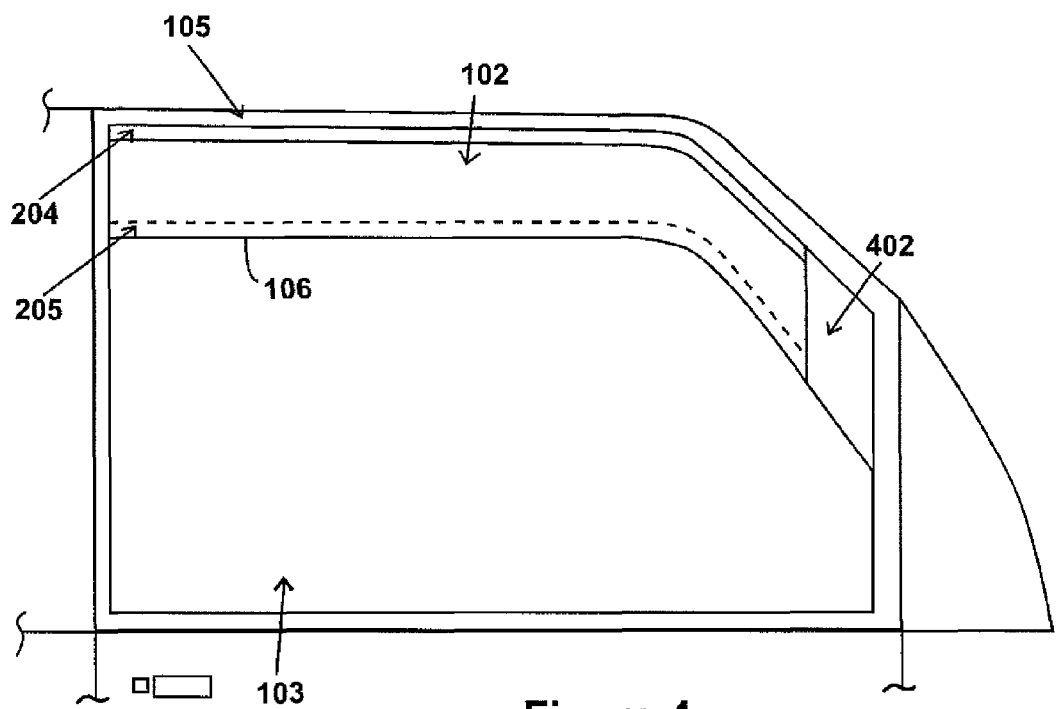
Figure 4

UNIVERSAL VEHICLE WINDOW VENT

CROSS REFERENCE

This application claims priority to U.S. Provisional Application No. 60/852,762, entitled "UNIVERSAL VEHICLE WINDOW VENT," filed on Oct. 19, 2006, and which is incorporated herein by reference.

FIELD OF THE DISCLOSURE

The present disclosure relates generally to the automotive field. In particular, the present disclosure relates to an automobile accessory which will allow for the ventilation of an automobile.

BACKGROUND OF THE DISCLOSURE

Drivers and passengers of automobiles may find it desirable to provide ventilation for the vehicles in which they are traveling. While all vehicles today have windows that roll up and down, the opening created by these windows when rolled down, no matter how slight, may cause undesirable conditions such as increased road noise and wind turbulence throughout the vehicle. Furthermore, weather conditions such as rain, snow, extreme heat or cold may create an uncomfortable atmosphere throughout the vehicle cabin if the opening created by rolling down the window is too large. Larger openings also increase the vehicle's aerodynamic drag which lowers the vehicle's fuel efficiency. Finally, passengers who smoke need only a slight opening in which to allow smoke and ash to escape the vehicle's cabin. The vast window area on today's automobile designs do not allow for small openings which will provide the desired ventilation without also producing the undesirable effects mentioned above.

SUMMARY OF THE DISCLOSURE

The present disclosure is directed to a universal vehicle window vent comprising a one-piece device which can be installed on any manufactured vehicle to provide a reduced area opening for the ventilation of an automobile. This is accomplished by providing a one-piece device wherein the bottom portion receives an automobile window and the top portion is set within the automobile door's window channel. No glue, fasteners, or clips are required to hold the present device in place. Instead, the force generated by the mechanism which raises and lowers the window (whether manual or electric) will hold the window vent in place while the vehicle is in use.

For purposes of summarizing the disclosure, certain aspects, advantages, and novel features of the disclosure have been described herein. It is to be understood that not necessarily all such advantages may be achieved in accordance with any one particular embodiment of the disclosure. Thus, the disclosure may be embodied or carried out in a manner that achieves or optimizes one advantage or group of advantages as taught herein without necessarily achieving other advantages as may be taught or suggested herein.

The present disclosure involves a vehicle window vent that can be adapted to any vehicle and any window on the vehicle whether driver side, passenger side, front, or back. The shape of the present disclosure can be customized by the user depending upon the shape of the vehicle window, such that the window fits securely within the device, which in turn fits securely within the vehicle door's window channel. In one embodiment, the open area created by the present disclosure can be customized by the user by removing portions of the device before its installation. The device can be formed from polyurethane or molded from clear or tinted acrylic, plastic, polymer, or any other suitable material capable of withstanding the forces placed upon the device in its intended application.

These and other embodiments of the present disclosure will also become readily apparent to those skilled in the art from the following detailed description of the embodiments having reference to the attached figures, the disclosure not being limited to any particular embodiment(s) disclosed.

BRIEF DESCRIPTION OF THE DRAWINGS

The present disclosure is described with reference to the accompanying drawings. In the drawings, like reference numbers indicate identical or functionally similar elements. Additionally, the left-most digit(s) of a reference number identifies the drawing in which the reference number first appears.

FIG. 3A is a cross-sectional view of a universal vehicle window vent of FIG. 1.

FIG. 3B is a cross-sectional view of an alternative embodiment of the universal window vent.

FIG. 4 is a side view of the universal vehicle window vent of FIG. 1 installed on a vehicle window.

DETAILED DESCRIPTION

The various embodiments of the present disclosure and their advantages are best understood by referring to FIGS. 1 through 7 of the drawings. The elements of the drawings are not necessarily to scale, emphasis instead being placed upon clearly illustrating the principles of the disclosure. Throughout the drawings, like numerals are used for like and corresponding parts of the various drawings.

Figure 1:
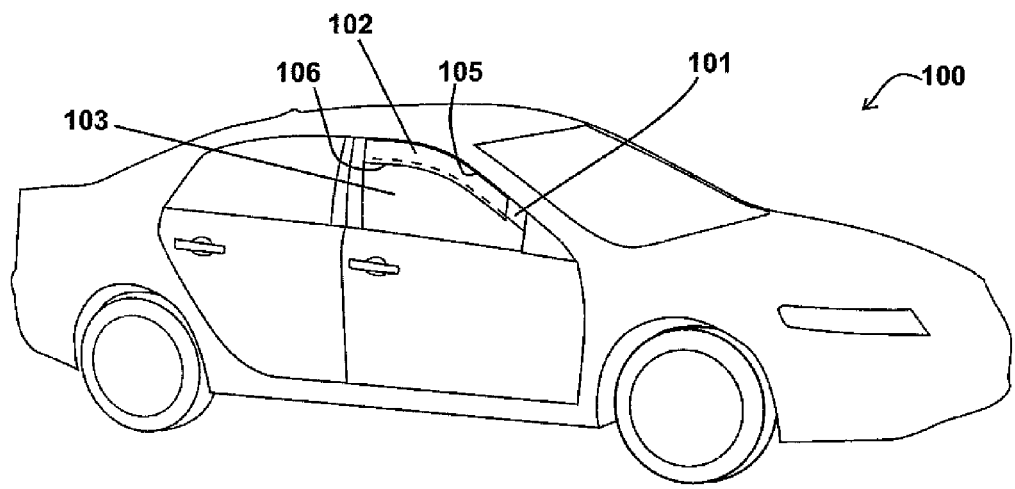
FIG. 1 is perspective view of an automobile with the universal vehicle window vent installed thereon.

FIG. 1 depicts an automobile 100. The automobile 100 comprises a window 103 which is shown in a slightly "rolled down" position. Inserted between the leading edge 106 of the window 103 and the door frame 105 is a universal vehicle window vent 102. In order to create an opening 101 of the desired size, a vent 102 is provided. The vent 102 is shorter than the length of the window 103 upon which the vent 102 is designed to fit. The bottom portion of the vent 102 receives the window 103, and the top portion of the vent fits within the door frame 105.

Figure 2:
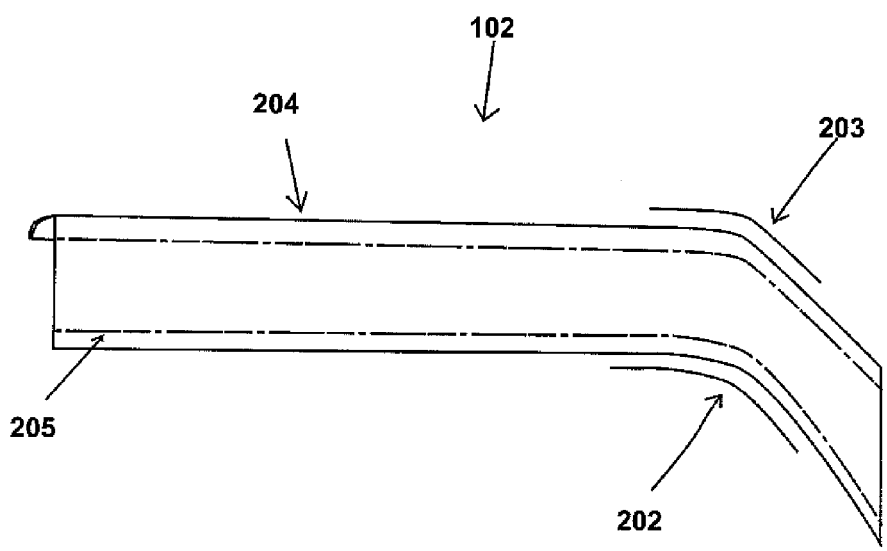
FIG. 2 is side view of the universal vehicle window vent of FIG. 1.

FIG. 2 depicts a plan side view of the vent 102. The vent 102 of the present disclosure is configured to fit on the window 103 (FIG. 1) in the door frame 105 (FIG. 1). Note that the curved shape of the vent 102 depicted in FIG. 2 may be modified to fit in other differently shaped window frames. Thus, other shapes are possible in other embodiments. The radius of curvature of the window substantially matches the radius of curvature of an interior curve 202, as well as an exterior curve 203, of the vent 102. The bottom portion 205 of the vent 102 receives the leading edge 106 of the window 103, and the top portion 204 of the vent 102 fits within the door's window frame.

The vent 102 can take as many forms as there are makes and models of vehicles such that the shape and design of the vehicle's window will determine the shape and size of the universal vehicle window vent. The user may simply cut away any portion of the universal window vent which does not fit within the vehicle door's window channel.

FIG. 3A depicts a cross-sectioned view of the vent 102. The legs 303 create a channel 304 on the bottom portion 205 of the vent 102. The top portion 204 of the vent 102 comprises a portion 301 that fits securely within the vehicle door's window frame 105. In an alternative embodiment, the cross section of the vent 102 can take the form depicted in FIG. 3B. In such an embodiment a body 308 of the vent 102 is wider than that shown in FIG. 3A.

FIG. 4 depicts a side plan view of the vent 102 inserted in a window 103. To install the universal vehicle window vent 102, the vehicle's window 103 is rolled down far enough to allow the window 103 to fit within the channel 304 (FIG. 3A) of the bottom portion 205 of the vent 102. The window 103 should then be rolled up with enough force to cause the top portion 204 of the vent 102 to fit within the vehicle door's window frame 105. Upon installation, the vent 102 will form an opening 402 in the vehicle.

Figure 5:
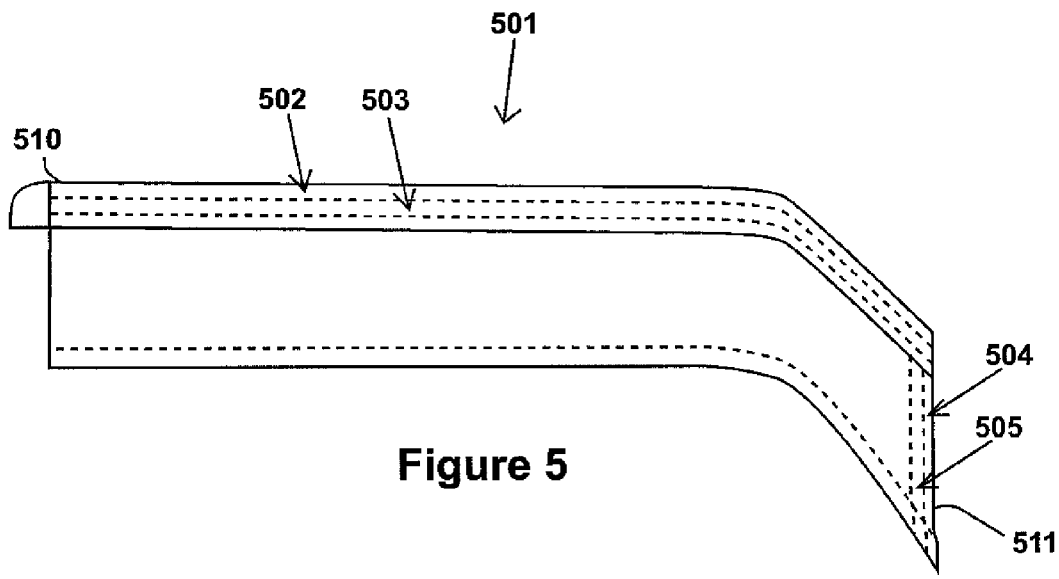
FIG. 5 is a side view of an alternative embodiment of a universal vehicle window vent.

FIG. 5 depicts a vent 501 illustrating another embodiment of the present disclosure. In such an embodiment the vent 501 is composed of a hard plastic or acrylic. Further, the perforated sections 502 and 503 are provided along the top 510, or perforated sections 504 and 505 are provided along the side 511. Such perforation sections 502-505 allow the user to customize the fit, as well as the opening which will be provided by the universal vehicle window vent once it is installed. A user (not shown) can remove one or more sections 502-505 to ensure a tighter fit within the frame 105 (FIG. 1). Further, each of the top perforated sections will be shaped to fit a different make and model vehicle.

Figures 6A, 6B:
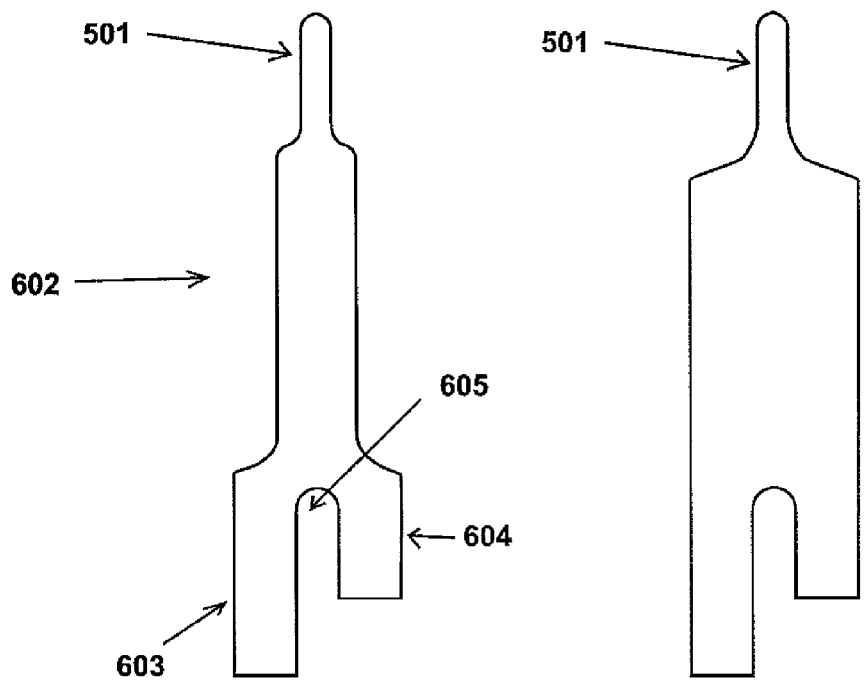
FIG. 6A is a cross-sectional view of an alternative embodiment of a universal vehicle window vent.
FIG. 6B is a cross-sectional view of an alternative embodiment of a universal vehicle window vent.

FIGS. 6A and 6B depict the cross-section of alternative embodiments of the universal vehicle window vent 602 wherein the channel 605 is formed from one leg 603 which is longer than the other leg 604 such that the user may hold the universal vehicle window vent 602 in place during installation by applying a force to the longer leg 603 in order to hold the universal vehicle window vent 602 against the vehicle window.

Figure 7:
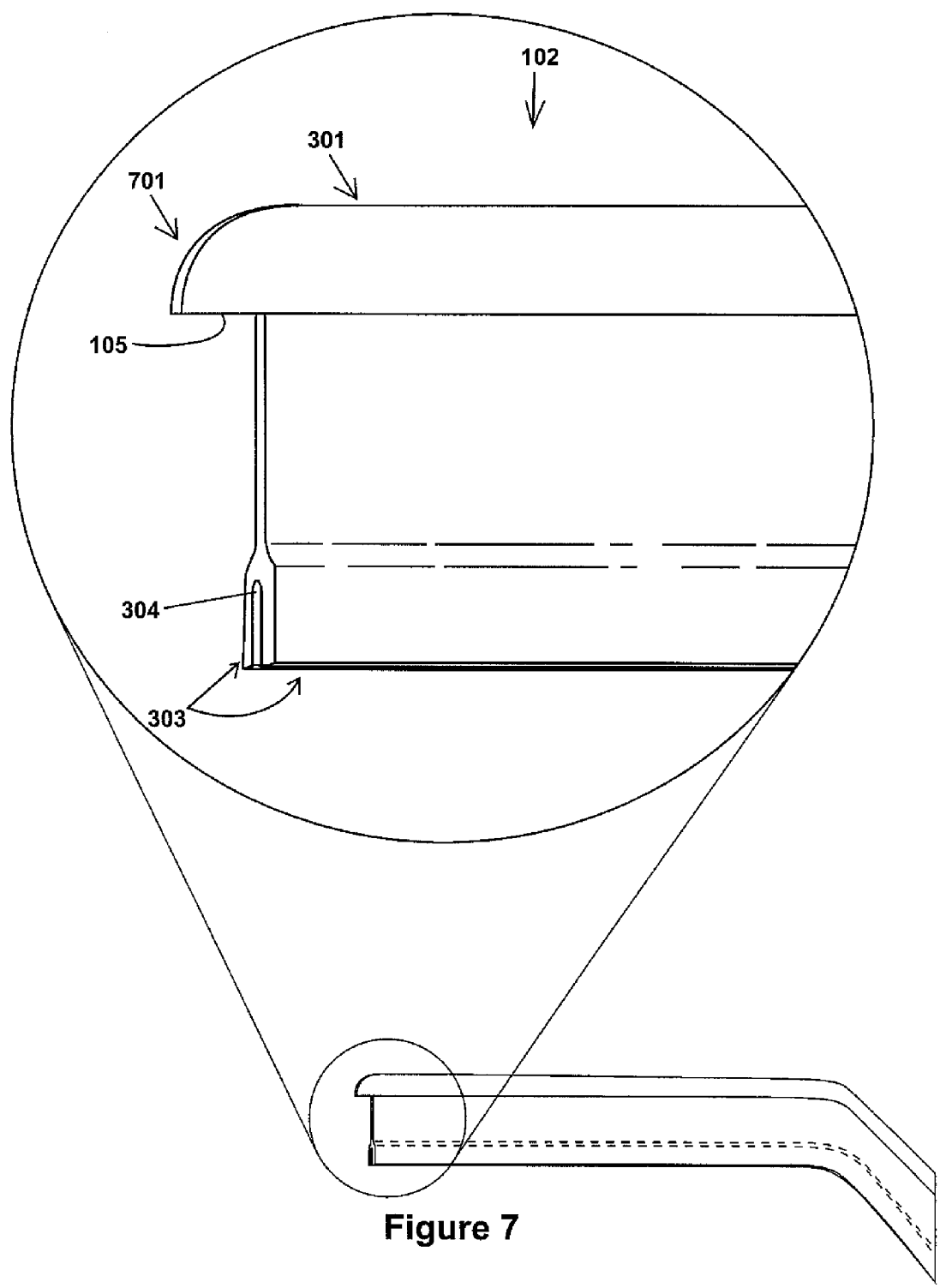
FIG. 7 is a close-up of the corner interface of the universal vehicle window vent of FIG. 1.

FIG. 7 depicts a close-up of the interface of the universal window vent 102 and the vehicle door window channel. In order to ensure a secure fit with the vehicle's door channel, the top portion 301 has a flange 701 that fits within the vehicle's door channel.

The dimensions of each of these embodiments will depend upon the make and model of the vehicle on which the universal vehicle window vent will be installed. As a general matter, the channel is between one-half and one and one-half inches deep and its width is determined by the width of the window on which it will be installed. The legs are between one-half and two inches inch tall, and the middle portion formed between the window-receiving bottom portion and the upper flange portion is from about one inch to five inches tall. The width of the top portion should match the width of the vehicle door window channel on which the universal vehicle window vent will be installed. In any case, the thickness and dimensions mentioned above are not intended to be limiting and will be depend upon the material used. In all cases, the dimensions should be sufficient to provide the strength necessary to withstand the forces placed upon it during operation.

This disclosure may be provided in other specific forms and embodiments without departing from the essential characteristics as described herein. The embodiments described above are to be considered in all aspects as illustrative only and not restrictive in any manner. The appended claims rather than the foregoing description shall indicate the scope of the disclosure.

As described above and shown in the associated drawings, the present disclosure comprises a universal vehicle window vent. While particular embodiments of the disclosure have been described, it will be understood, however, that the disclosure is not limited thereto, since modifications may be made by those skilled in the art, particularly in light of the foregoing teachings. It is, therefore, contemplated by the appended claims to cover any such modifications that incorporate those features or those improvements that embody the spirit and scope of the present disclosure.

I claim:

1. A window vent comprising:
  a bottom portion for receiving a vehicle window, where the bottom portion comprises a first leg and a second leg positioned apart such that a channel is defined between the legs, where the channel is proportioned to receive the vehicle window;
  a top portion for coupling with a vehicle door window frame, where the top portion comprises a flange proportioned to fit within the vehicle door window channel;
  a plurality of perforations
along the top portion, such that the top portion is removable to ensure a tighter fit within the frame
  a body defined between the bottom portion and the top portion, where the body has an arcuate shape with a radius of curvature that substantially matches the radius of curvature of the vehicle window;
  where the window vent has a length shorter than a length of the window such that an opening is defined between the vehicle door frame, the window vent, and vehicle window; and
  where the window vent is a one piece device consisting of a hard plastic.

2. The window vent of claim 1 wherein the plurality of perforations extend from the top portion to the bottom portion of the window vent along a side of the window vent, such that the side of the window vent is removable to customize the size of the opening.

3. A method comprising:
  Removing a perforated portion of said top portion so that a top portion of a one piece window vent is customized to fit within a door frame of a particular make and model vehicle;
  Rolling down a vehicle's window far enough to allow the window vent to be positioned on top of the window;
  Positioning a channel of the window vent on a leading edge of said vehicle's window such that a radius of curvature of a bottom portion of the window vent substantially matches a radius of curvature of the window, where the window vent consists of hard plastic, and where a window vent length is shorter than a window length such that the window vent ends at a position short of the front of the window; and
  Rolling up said window until a top portion of the device engages a window frame on said vehicle, where the window vent has a body that is sufficiently tall to create an opening between the window, the window vent, and the door frame.

4. The method of claim 3 further comprising the step of removing a perforated portion of a side of the window vent to customize the window vent length, so the size of the opening between the window vent, the window, and the door frame is adjusted.

* * * * *